H. P. Dillingham.
Guide for Saw in Saw-Mills.

N° 71859      Patented Dec. 10, 1867.

WITNESSES
R. Clayton
J. G. Clayton

INVENTOR
H. P. Dillingham
by atty. Jo. C. Clayton

United States Patent Office.

HIRAM P. DILLINGHAM, OF NORWALK, OHIO.

Letters Patent No. 71,859, dated December 10, 1867.

---

IMPROVEMENT IN GUIDES FOR SAWS IN SAW-MILLS.

---

The Schedule referred to in these Letters Patent and making part of the same.

---

TO ALL WHOM IT MAY CONCERN:

Be it known that I, HIRAM P. DILLINGHAM, of Norwalk, in the county of Huron, and in the State of Ohio, have invented certain new and useful "Improvements in Self-Adjusting Saw-Guides;" and I do hereby declare that the following is a full, clear, and exact description thereof, reference being had to the accompanying drawings, and the letters of reference marked thereon, in which—

Figure 1:
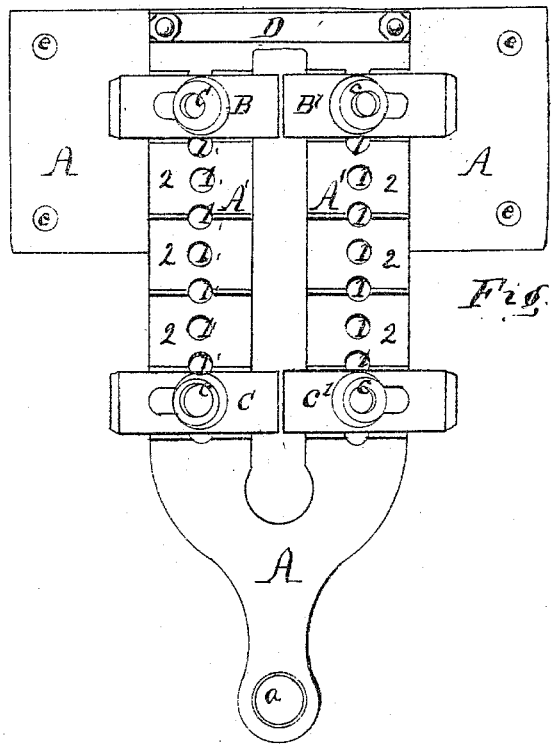
Figure 2:
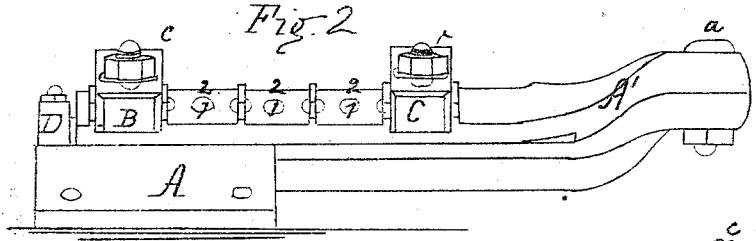
Figure 3:
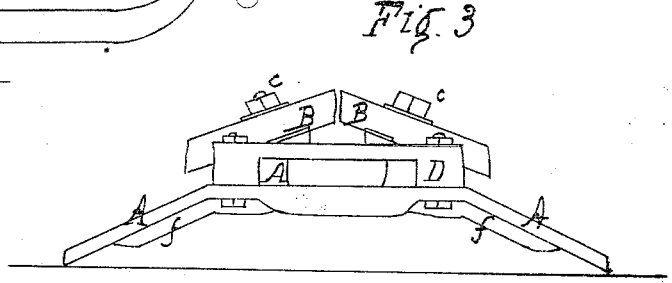

Figure 1 is a plan view,
Figure 2 is a side elevation, and
Figure 3 is an end view.

The nature of my invention consists in the use of a stationary curved plate, fastened to the guide-ways, with an oscillating plate at one end, and stationary at the other, to correspond in shape with the stationary, with movable guides attached for guiding the saw in saw-mills, as will be hereinafter fully set forth.

To enable others skilled in the art to make and use my invention, I will proceed to describe its construction and operation.

In the construction of my invention, A is a curved metal plate, with sides extending a sufficient distance below the body of the said plate to allow the same to be securely fastened to the guide-ways by means of screws e e e e. This bed-plate extends forward far enough to cover the width of the saw. Above this bed-plate A is placed a sliding plate, A', which is attached to bed-plate A by means of bolt a in front, and on which bolt it fits loosely. At the rear end of bed-plate A is attached a groove, D, into which fits a tongue on the rear end of slide plate A', and which oscillates in said groove and on bolt a, thus allowing an oscillating motion, when required, to said plate A'. A slot is made through both the bed-plate A and slide-plate A' to admit the saw. On the under side of bed-plate A are cast flanges, f f, for support to said plate A. In construction of slide-plate A', I make several spaces, with holes, 1 1 1, to allow the guide-pieces to set closer, so as to correspond with the width of the saw used. The spaces are designated by the figures 2 2 2 2. The guides B B' and C C' are made of wood, or any suitable material, and made to fit the spaces 2 2 (having grooves on the under side) on slide-plate A', to which they are fastened by bolts c c. These guides have each a slotted opening, through which the bolts pass to allow of adjustment to the thickness of the saw. These guides are placed on the slide-plate A', as seen in figs. 1 and 2, leaving a space between them to receive the saw, when they are fastened by bolts c c to the slide-plate A', and if required to adjust them to suit different thicknesses of saws, it is easily done by loosening the bolts c c, and sliding the guides B and B' and C C' to the point required. Then fasten the nuts and the saw-guide will perform as required. The opening should not be too small, so as to bind the saw while doing its work, but be allowed to do its work without binding.

The above description represents the under side of the machine when placed above the log, and the top or upper side when placed below the log.

In the operation of my invention, (having placed the same in position for use by screwing it to the ways with the saw in position,) it will be seen that while the saw keeps in a straight line all is right, and no guide is required to keep the saw straight; but if the saw begins to run to the right or left in its cut, then the guides B B' and C C' begin their work. If the saw should run to the right of the straight line, then the right side of the saw, near the edge, would press hard against guide C, tending to carry the whole guide to the right; but being stationary at the point a, in figs. 1 and 2, it will cause the guide B', on the opposite side and back of the saw, to bear firmly against the saw, thus turning it into line, and when in line again, the saw will work free of the guide, as at first. If the saw should run to the left, the saw will act on the guide B and C' in the same manner, and thus strengthen the saw, and set it in line again.

Thus it will be seen that my invention acts as an automatic saw-guide, and can be applied to all mills; and for resawing by my invention I am able to use a much thinner saw than otherwise, which will cheapen the price of saws; and thus using a thinner saw, I can save material in sawing, and this is an important matter, especially in resawing lumber.

Having thus described my invention, what I claim as new, and desire to secure by Letters Patent, is—

The plates A and A', guides B B' and C C', the whole constructed substantially as described, and operating as and for the purposes set forth.

In testimony that I claim the above-described invention, I have hereunto signed my name, this 27th day of May, 1867.

HIRAM P. DILLINGHAM.

Witnesses:
  PETER B. HOYT,
  ISAAC W. BOSTWICK.